May 24, 1927.

F. M. JOBES 1,629,195

INTERNAL COMBUSTION ENGINE

Filed March 4, 1924

Inventor
Frank M. Jobes,
By Watson, Coit, Morse & Grindle
Attorney

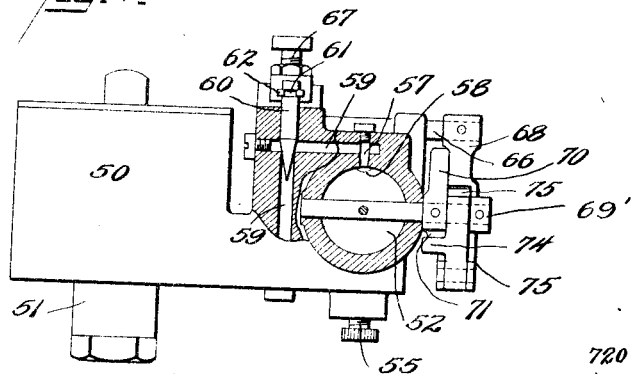

Patented May 24, 1927.

1,629,795

UNITED STATES PATENT OFFICE.

FRANK MYRON JOBES, OF ANN ARBOR, MICHIGAN.

INTERNAL-COMBUSTION ENGINE.

Application filed March 4, 1924. Serial No. 696,878.

This invention relates to internal combustion engines and more particularly to that type of internal combustion engine operating on what is commonly known as the constant volume cycle and using fuels of the light hydrocarbon group.

The principal object of this invention is to increase the thermal efficiency of internal combustion engines.

Another object of this invention is to increase the power output of internal combustion engines working on the constant volume cycle.

A further object of this invention is to design a combustion chamber for an internal combustion engine operating on a constant volume cycle in such a manner that maximum turbulence is obtained throughout the throttle range resulting in complete combustion of the combustible mixture under all conditions.

A still further object of this invention is the provision of a so-called single valve engine in which no combustible mixture is carried away by the exhaust products of combustion.

It is the purpose of this invention to provide in an internal combustion engine, having a pocket adjacent the main combustion space and connected thereto by a restricted opening, means for supplying an abnormally rich mixture to the pocket and igniting it there so that the issuing flaming mixture is rapidly swept away from the mouth of the pocket and intimately commingled with the air or leaner mixture in the main combustion space.

Another purpose of this invention is to provide means for controlling detonation at the higher throttle ranges whereby a considerably increased compression ratio may be effectively used.

It is well known that the principal factor controlling the thermal efficiency of an internal combustion engine is its expansion ratio which is seriously limited in engines of the usual type by the phenomena of detonation, so that it is not permissible to compress the mixture previous to ignition to more than about one-fifth of its normal volume. Various means have been devised in the endeavor to control the detonation and enable the use of considerably higher compression ratios but none of them have been completely successful in that they seriously hamper the output of the engine in one manner or another. It is now the consensus of opinion, confirmed by considerable experimental work, that one of the principal factors affecting detonation is the extremely high temperature attained in spots on the walls of the combustion chamber, the most important local hot spot being the exhaust valve which aside from being exposed on its upper surface to the high temperatures of combustion, is almost completely surrounded by the extremely hot gases throughout the entire exhaust stroke.

According to my invention the usual cylinder of an internal combustion engine is provided with a main combustion chamber as nearly hemispherical in shape as possible and located as far as practicable to one side of the top of the cylinder proper with a minimum clearance between the top of the piston and the overhanging portion of the cylinder head beyond the combustion chamber. Opening into this combustion chamber is arranged a single mechanically operated valve which may be of any desired type serving both to exhaust the products of combustion and to admit during the latter part of the intake stroke a volume of pure air. The passage communicating with this valve is controlled by a rotary distributor valve driven synchronously from the crank shaft of the engine and so timed as to alternately connect the passage with an exhaust and an air inlet manifold and also to entirely close off the passage throughout the early part of the intake stroke. In the upper wall of the combustion chamber there is an opening communicating through a restricted passage with a small pocket suitably cooled by the cooling medium of the engine and connected at its upper end to a carburetor, there being an inwardly opening spring controlled poppet valve interposed between the carburetor and the pocket and an ignition plug inserted through one of the side walls of the pocket. The axis of this pocket and restricted opening is directed away from the piston head into the main part of the combustion space.

An engine built according to my invention as above described operates as follows:

During the first part of the intake stroke the rotary distributor valve closes the passage between the single mechanically operated valve and both the exhaust and air intake manifolds and thus in spite of the fact that the single valve is open no air is drawn in through it but the spring controlled poppet valve in the top of the isolated pocket is caused to open due to the reduced pressure within the combustion chamber and combustible mixture is drawn into the pocket from the carbureter which is so adjusted as to supply an excessively rich mixture. At the completion of about 20% of the intake stroke the rotary distributor valve opens the passage to the single valve by way of the air intake port so that pure air is drawn into the combustion chamber throughout the remainder of the intake stroke, at the completion of which the single valve is closed and the compression stroke takes place. The rich mixture in the pocket is ignited, expands, and the flaming mixture is projected into the combustion chamber with violent turbulence due to the shape of the restricted passage so that the flaming mixture or any lean mixture formed by commingling of fuel and pure air completely intermingles with the enclosed compressed air already in a state of high turbulence which supplies the necessary oxygen for the complete combustion of all the hydrocarbon fuel. At the completion of the power stroke the distributor valve has connected the passage from the single valve to the exhaust manifold and the single valve opens allowing the exhaust gases to escape which completes the cycle of operations.

This invention may be best understood by reference to the following specification taken in conjunction with the attached drawings wherein:

Fig. 2 is a chart showing the timing of the single valve;

Fig. 3 is a chart showing the timing of the rotary valve;

Fig. 4 is an elevation partly in section of a special type of carbureter adapted to be used with the engine;

Fig. 5 is a vertical longitudinal section thereof; and

Fig. 6 is a side elevation of the carbureter showing the control mechanism.

Figure 1:
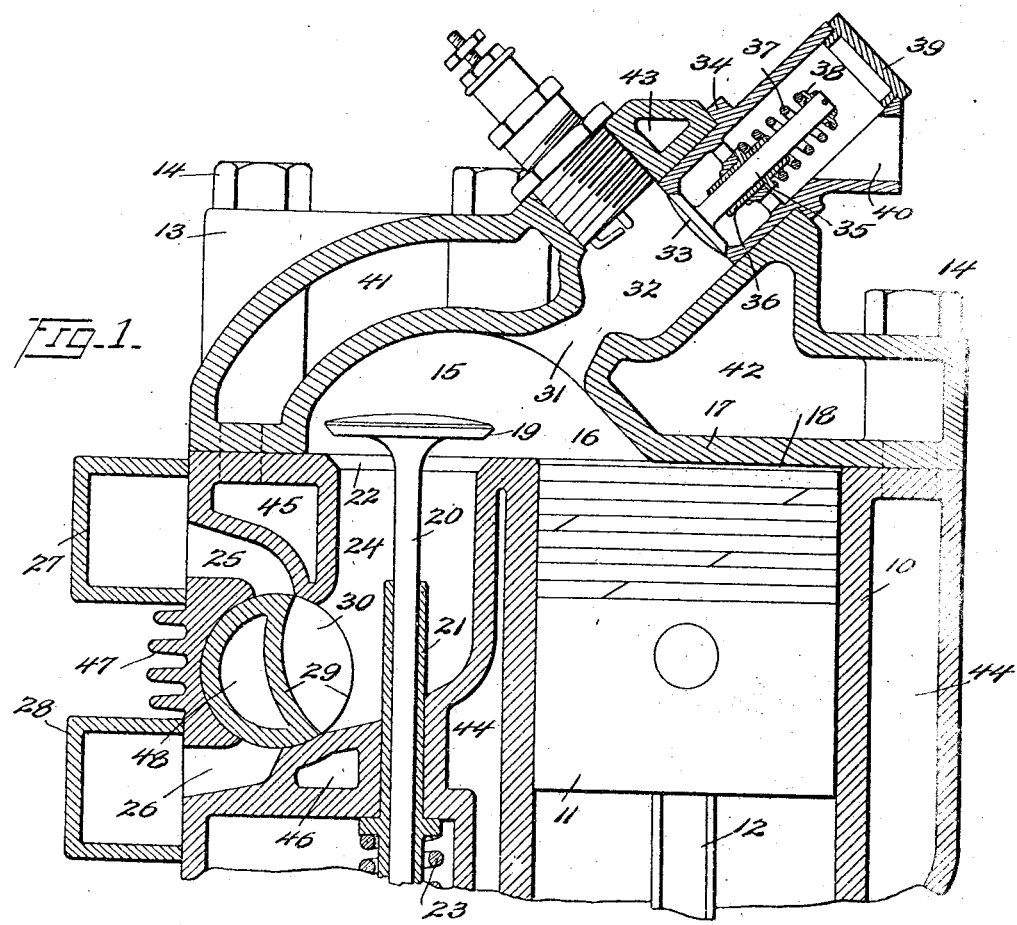
Fig. 1 is a longitudinal transverse section of a cylinder of an internal combustion engine constructed in accordance with my invention.

Referring to Figure 1 it will be noted that the engine comprises the usual cylinder 10 in which is adapted to travel a piston 11 connected by means of a connecting rod 12 to the conventional type of crank shaft (not shown). The top of the cylinder block is horizontal and the head of the piston 11 when at the top dead center reaches almost to the surface of the cylinder block. A cylinder head 13 is bolted to the cylinder block in the conventional manner by means of bolts 14, 14 and contains a substantially hemispherical space 15 which comprises the main combustion chamber. This combustion chamber is located largely to one side of the cylinder and piston leaving only the constricted passage 16 having a cross section at least equivalent to the valve opening area, connecting the two, with a portion 17 of the cylinder head overhanging the cylinder bore leaving a small clearance 18 between the top of the piston and the overhanging portion of the cylinder head.

Located beside the cylinder and opening into the main combustion chamber is a valve 19 which may be of any suitable type and which I have shown here as being of the conventional poppet design, having a stem 20 operating in a valve guide 21 pressed into the casting of the cylinder block. The valve 19 is adapted to cooperate with the valve seat 22 in the top of the cylinder block and normally be held against that seat by means of the usual type of valve spring 23. The passageway 24 beneath the valve communicates through the ports 25 and 26, (which are widened giving them each a capacity approximately the same as 24) with the exhaust and intake manifolds 27 and 28 respectively.

A rotary distributor valve 29 having a cutaway portion 30 serves to connect the passage 24 with either port 25 or 26 or completely cut it off from either. This valve may be driven from the main or cam shaft in such a manner as to be properly synchronized therewith and operate as later described in connection with Figure 2.

Arranged in the upper wall of the combustion chamber is a small converging port 31 leading to a pocket 32 located in such a position that the axis of the pocket passing through the center of the port 31 is directed away from the cylinder bore and substantially toward the center of the combustion chamber. In the far end of this pocket there is provided a poppet valve 33 opening inwardly and mounted in a valve cage 34 which may be suitably threaded into the outer end of the pocket. The valve 33 is provided with a stem 35 adapted to slide in a guide 36 supported by a spider integral with the cage and is held against its seat by means of a spring 37 bearing at one end upon the valve guide and at the opposite end upon a washer 38 suitably mounted on the extreme end of the valve stem. The valve cage 34 is closed at the top by means of a threaded cap 39 and has extending from it on one side a port 40 which is adapted to be connected to a carbureter when used with a single cylinder engine or to a suitable intake manifold when used with a multi-cylinder engine. An ignition plug is threaded through one side wall of the pocket 32.

The engine shown is adapted to be cooled by water in the usual manner and for this purpose the head is provided with the water passages 41, 42 and 43 through which the cooling water is adapted to circulate carrying off the heat of combustion from the combustion chamber and maintaining the walls of the pocket at a uniformly low temperature in order to prevent auto-ignition therein. The cylinder is provided with the water jacket 44 and the valve passage 24 and ports 25 and 26 together with the rotary valve 29 are suitably cooled by water passing through the passages 45 and 46. The rotary valve is further cooled by means of radiating flanges 47 formed integral with the outer wall of the engine block casting.

The engine may be lubricated in any manner desired and in order to properly lubricate the rotary valve 29 any suitable means may be employed. The method of lubricating this valve does not form any feature of this invention and it may even be found that sufficient lubrication will be supplied by exhaust products of combustion passing over the valve.

As shown in Figure 2 the single valve 19 remains open throughout the exhaust and intake strokes which follow each other successively so that while this valve is heated by the explosion within the combustion space and further by exhaust gases passing around it during the exhaust stroke it is immediately cooled by the incoming air so that when it is closed for the compression and firing strokes its temperature is not sufficient to cause or assist in the phenomena of detonation.

By reference to Figure 3 the mode of operation of the rotary distributor valve may be noted.

Starting with the piston at top dead center (beginning of the suction stroke) as shown in Figure 1, it will be noted that the distributor valve 29 has cut off communication between the passage 24 and both the passages 25 and 26, so that even though the poppet valve 19 is open the passage of gases to the cylinder is entirely cut off by the distributor valve. As the crank shaft rotates, and with it the valve 29, which is timed to revolve at one-half crank shaft speed, and the piston descends thru the first part of the suction stroke (preferably 15% to 20%) the distributor valve maintains the passages 25 and 26 cut off from 24. Upon completion of the preferred portion of the stroke the valve 29 begins to uncover passage 26, permitting air to flow from the air manifold thru passages 26 and 24 into the cylinder. At the end of the intake, usually about 45° after bottom dead center of the intake stroke proper, the single valve closes as shown in Figure 2, and at the same time the distributor valve rotates as shown in Figure 3 and begins to close off port 26. Following the intake stroke the usual compression and explosion strokes occur in their order, during which time the valve 19 remains closed as shown in Figure 2, until about 45° before completion of the power stroke, when, as is the usual practice, the valve 19 is opened. During the compression and explosion strokes the distributor valve has rotated and commenced to uncover the port 25 before the opening of valve 19 so that when this latter valve does open the exhaust gases may flow out to the manifold 27. During the exhaust stroke the distributor valve continues to rotate and as shown in Figure 3 closes off the passage 25 as usual about upper dead center. The valve 19 remains open throughout the exhaust stroke which completes one cycle for the valve mechanism. In Figure 3 the dark portions of the curve represent the distributor valve connecting the single valve passage respective to the air passage and the exhaust passage, and the light portions indicate positions of the distributor valve in which the passage 24 is cut off from communication with either of the manifolds 27 or 28.

During the initial part of the intake stroke the pressure within the combustion chamber 15 is lowered since the piston is moving outwardly and enlarging the combustion space. This causes the valve 33 to open against the action of the spring 37 drawing in through the port 40 a charge of excessively rich mixture varying from insufficient to fill the pocket at minor engine loads to a considerable excess over the volume of the pocket at full engine loads which is ignited in the pocket by the spark plug at the proper time, the excessively rich flaming mixture issuing through the port 31 and mixing with the air or lean mixture in the chamber 15 is completely burned during the power stroke.

It is essential in an engine of this type that during the intake stroke the combustible mixture be maintained substantially isolated from the air admitted during the latter part of the intake stroke at the minor engine loads until the heat released upon combustion is sufficient to insure the complete combustion of any lean mixture built up by commingling of any of the rich mixture with the large excess of air admitted. This condition may be secured by making the volume of the pocket large enough so that the total volume of rich mixture as supplied from a conventional type carbureter adjusted to give the excessive richness, will be sufficient to fill the pocket only above the point in the throttle load where the heat liberated insures the combustion of any excessively lean mixture formed with the air as previously described. At lower throttle loads the volume admitted will be insufficient to fill the pocket; and at fuller throttle loads the excess admitted over the pocket volume will intermingle with the air during intake and compression strokes until at the full engine loads a mixture only slightly lean will fill the main combustion chamber. It is however highly desirable that the volume of the pocket be maintained as small as possible, and it may be reduced in size by arranging to vary the engine power at its minor outputs by introducing to said pocket during the early part of the suction stroke a constant volume of combustible mixture and varying the strength of the constant volume from the minimum to the point in the engine load when it is permissible to build up a lean mixture in the main combustion chamber by commingling fuel and the pure air, after which the engine load is increased by increasing the volume of mixture admitted to the pocket thus increasing the strength of the mixture built up by the commingling of fuel and air until at full engine load a mixture only slightly lean is so formed.

In order to supply such a mixture I have designed a carbureter which is illustrated in Figures 4, 5 and 6 but it is to be understood that other forms of carbureters may be satisfactorily used with this type of engine by paying attention to the size and design of the pocket 32.

Referring to Figures 4, 5 and 6 it will be noted that the carbureter is built along conventional lines by having the usual float chamber 50 into which fuel is conducted by a pipe connected to a strainer 51. A float maintains the fuel level constant and a throttle valve 52 of the butterfly type arranged in the induction passage 53 serves to control the amount of mixture taken in by the engine. A simple jet 54 whose capacity is adjustable by means of a tapered end screw 55 is supplied with fuel from the float chamber 50 and opens into a Venturi tube 56 in the induction passage 53. The above features are all common and well known, but in addition to them I provide the following new features which include an orifice 57 leading into the induction passage 53 at the top of the same and at the point against which the throttle valve 52 rests when in its closed position, the throttle valve being cutaway slightly at this point as shown at 58 to provide an air passage opposite the orifice 57. A passage 59 connects the orifice 57 with the float chamber and a metering pin 60 vertically arranged in an extension of the passage 59 serves to control the amount of fuel passing to the orifice 57. The upper end of the metering pin 60 is provided with a groove 61 in which fits the extreme forked end of a lever 62 pivoted at 63 and pressed downward by means of a flat spring 64. Upward movement of the metering pin 60 is obtained from a cam 65 mounted on a master control shaft 66 journaled in the casting of the carbureter and in order to regulate the amount of fuel flowing through passage 59 the lever 62 is provided with a screw 67 passing therethrough and bearing on the cam 65 so that by turning this screw inward the metering pin may be raised and vice versa.

The master control shaft 66 has provided on one end an arm 68 and the shaft of the butterfly valve 52 is provided with an arm 69 having a loose fit and maintained thereon by collar 69'. An additional lever having two arms 70 and 71 is rigidly fastened to this same shaft and the arm 70 is biased in a clockwise direction by means of a coiled spring 72. The arm 71 is provided near its end with an adjusting screw 73 the end of which is adapted to cooperate with a shoulder 74 on the arm 69. The arms 68 and 69 are connected together by a link 75 so that any movement of the master control shaft 66 is imparted to the arm 69 but considerable movement of this arm is necessary before the screw 73 is engaged by the shoulder 74 to move the butterfly valve. This feature permits the cam 65 to raise the lever 62 carrying with it the metering pin 61 in order to permit an additional supply of fuel at the orifice 57 as the shaft 66 is rotated so that additional demands from the engine are met and the mixture gradually increased in richness until the throttle valve opens.

The operation of this carbureter is as follows:

With the master control shaft 66 moved to its extreme clockwise position it will be noted that the butterfly valve 52 is closed and the metering pin 60 moved to its lowest position and with this setting the initial adjustment of the metering pin can be made for proper idling of the motor by means of the regulating screw 67. As the master control shaft 66 is moved in counterclockwise direction there will be no opening of the throttle 52 until the shoulder 74 contacts with the screw 73 but during this early rotation of the shaft 66 the movement of the cam 65 raises the lever 62 and with it the metering pin 60 increasing the flow of fuel to the orifice 57 thus increasing the richness of the mixture formed at this point. Fuel will only be drawn from the orifice 57 when there is a high vacuum at this point and it is obvious that when the butterfly valve begins to open the flow of fuel to this orifice will decrease owing to the reduced vacuum as the opening of the valve enlarges the passage adjacent the orifice. However with the opening of the throttle there is an increase in the vacuum behind the throttle and fuel is induced to flow from the simple jet 54, which fuel forms with the passing air a mixture whose richness may be adjusted by the tapered screw 55 to that quality which is desired.

Since the main jet of this carbureter is uncompensated, its normal action as is well known is to increase the mixture in richness as the engine load or speed increases and while this is not entirely desirable in engines of this type they will operate quite satisfactorily under ordinary conditions with an uncompensated carbureter jet. It is however quite a simple matter to provide a compensating means such as a simple automatic air valve located between the main jet and the throttle valve to correct this tendency.

The operation of an engine constructed according to the preceding description will first be considered at light loads where the throttle opening is small. Consider the piston to be at top dead center at the beginning of the intake stroke, the rotary valve 29 closes off both ports 25 and 26, the single valve 19 is open, then during the first portion of the intake stroke an excessively rich mixture is drawn in through the port 40 and since the throttle valve 52 is closed the quantity will be no more than necessary to fill the pocket 32 before the rotary valve 29 uncovers the port 36 and the influx of pure air increases the pressure within the combustion chamber 15 so that the valve 38 is closed by spring 37, drawing back within the pocket any of the combustible mixture which may have escaped into the port 31. The single valve 19 is then closed, the usual compression stroke takes place and owing to the closeness of fit between the top of the piston and the overhanging portion 17 of the cylinder head, violent turbulence is imparted to the compressed air at the finish of the compression stroke. At this point the rich mixture in the pocket 32 is ignited, expands, and issues through the port 31 in a flaming condition being immediately swept away from the mouth of the port by the turbulent pure air in the chamber 15 with which it mixes completing its combustion. As the burning fuel in the pocket 32 expands its center of pressure moves outward assisted by the turbulent air in the combustion chamber 15 so that substantially all of the combustible mixture comes in contact with the air in the combustion chamber 15 and is thus completely burned. It may be noted that the piston starting on its outward stroke again produces a turbulent condition in the cylinder due to the sudden expansion of the small clearance space 18 causing gas in the combustion chamber 15 to rush into this vacancy, thus causing it to sweep rapidly by the mouth of the port 31 serving to more quickly carry away the flaming mixture which is thus better commingled with the pure air in the combustion chamber. Upon the completion of the power stroke the single valve 19 is opened, the distributor valve 29 directs the products of combustion out through the port 25 into the exhaust manifold 27 and the cycle is then repeated.

In operating through the intermediate throttle ranges more of the excessively rich mixture is drawn in port 40 because the throttle 52 is more widely open and considerable of this mixture flows through the port 32 and into the combustion chamber 15 where it is mixed with the pure air taken in through the port 26, thus forming a lean combustible mixture in the combustion chamber at the same time leaving an excessively rich mixture in the pocket 32 so that when ignition takes place the flaming mixture issuing through port 31 mixes with and ignites the lean mixture in the combustion chamber 15 assisted by the turbulence previously explained.

At the fuller throttle loads a large portion of the excessively rich combustible mixture is drawn into the main combustion chamber where it is intermingled with the air later admitted thus building up a mixture which is only slightly lean and which fills the entire main combustion chamber and which is ignited by and commingled with the flaming mixture issuing from the port 31. At this point it should be noted that the mixture admitted at all times through the port 40 is too rich to be completely burned and (with the exception of low engine loads) complete combustion is only obtained by mixing it while in its burning condition with air or a leaner mixture in the main combustion chamber. At the fuller throttle loads in an engine of the localized (partial) charge type such as this, wherein but a slightly lean mixture is built up in the main combustion space by an admixture of the fuel and air the cooling of the exhaust valve, and the introducing of a quantity of products of combustion are of considerable importance since as the richness of the mixture approaches normal the tendency to detonate increases and only by controlling this tendency can the unusual high power output be obtained from the unusually high compression used. With the higher compression ratio there is a corresponding increase in the temperature to which the valve is exposed, but by allowing the stream of cool air to flow over the valve immediately after it has been heated it is maintained at a very moderate temperature and does not promote detonation.

Engines of the localized type and especially those as above described, have the advantage of introducing at all throttle loads a full piston displacement of gas so that the high compression ratios are available throughout the whole throttle range, which makes possible a much higher thermal efficiency at part throttle load than is possible in an engine of the conventional type, but it has been found that where the isolated chamber 32 is arranged coaxial with the bore of the cylinder and the volume of rich mixture is confined as far as possible, even at the full throttle loads, entirely to the isolated pocket that there is not sufficient turbulence in the combustion chamber during combustion to secure the rapid and complete comingling of the flaming rich mixture, discharged from the pocket, with the air or extremely lean mixture filling the main combustion chamber as is necessary to secure the burning of a mean near normal mixture and a high maximum power output, and consequently while these engines are economical at the lower throttle loads they fail to give the desired high maximum power output, whereas an engine built according to my invention will be found to incorporate both of these desirable features. This is accomplished by localizing the charge only until the engine load is great enough to insure the complete combustion of any excessively lean mixture formed in the main combustion chamber 15 and then increasing the strength of the mixture formed in the main combustion chamber by carrying a large volume of the rich mixture out of the pocket as the engine load increases to its maximum and intermingling it during the remainder of the intake stroke, and the compression stroke with the large volume of air admitted. Thus at full throttle loads a near normal mean mixture is burned under unusually high compressions made permissible by inherent characteristics of the invention controlling detonation.

It has been found that detonation at the higher compression ratios may be materially reduced or entirely suppressed by mixing with the fresh charge a quantity of inert gases and since such gases are available in the form of carbon dioxide and nitrogen, in the waste products of combustion it has been proposed to admit small quantities of exhaust gas with the induced charge at the higher throttle loads in order to prevent detonation. This feature is automatically taken care of by my construction for the passage 24 entraps a certain quantity of the exhaust gas which is drawn in with the pure air taken through the port 26, and it should be noted that the quantity of these inert gases varies directly with the throttle position of the engine. For low throttle ranges but little combustible mixture is taken in and is burned in a large quantity of air and hence the products of combustion passing out through the exhaust portion are largely diluted with air, whereas at the full throttle loads a near normal mixture is burned and hence the products of combustion comprise mostly nitrogen and carbon dioxide.

By using a single valve such as 19 instead of the conventional two valves I am enabled to form the combustion chamber more nearly hemispherical which shape results in a maximum efficiency since it has a minimum surface from which the heat may be radiated, but with the usual form of single valve engine where the distributor valve controls an intake port such as 26 for combustible mixture and an exhaust port such as 25 it will be noted that during each intake stroke the passage 24 will be filled with combustible mixture which is blown out through the exhaust port during the exhaust stroke and wasted aside from contributing considerable heat as it burns in the exhaust passage.

The operation of this engine then consists in general of drawing into the compression chamber during the first part of the intake stroke a volume of excessively rich mixture, then drawing in during the remainder of the said stroke a large volume of air, maintaining the small volume of rich mixture substantially isolated from the large volume of air, during the intake stroke at the minor engine loads, up to that giving temeprature and pressure of combustion sufficient to insure the complete combustion of any lean mixture formed, by admixture of a part of the rich mixture and the large volume of air; forming during the intermediate and maximum throttle loads a mixture varying in strength from pure air to an only slightly lean mixture at full engine load by intermingling fuel carried out of the pocket with the large volume of air admitted; compressing this charge into an offset combustion chamber and igniting it. The inherent features controlling detonation being the high degree of turbulence in the main combustion space induced by the offset combustion chamber construction, the cooling of the single valve opening into the combustion space and the dilution of the combustible mixture with products of combustion which dilution is proportional to the engine load.

The above description together with the explanation of the operation of this engine clearly discloses that I have invented a number of material improvements in engines of the internal combustion type, but it should be understood that while I have shown a particular modification in the drawings that my invention is not so limited since the same results may be obtained by a number of mechanical variations. The timing of the valve mechanism may also be modified somewhat in application of the invention to engines for various kinds of service.

Any suitable means may also be used to heat the charge of mixture supplied to the pocket 32 to insure a more complete vaporization of the fuel when fuels containing the high hydrocarbons are being used.

The engine may be built with any number of cylinders desired and with any suitable means of lubrication, cooling etc.

Having thus described the invention what is claimed as new and desired to be secured by Letters Patent is:

1. In an internal combustion engine of the L-head type, a cylinder, a valve, a piston reciprocating in said cylinder, a combustion chamber adjoining and communicating restrictedly with the end of said cylinder, the end of said cylinder being otherwise permanently closed by a head substantially engaged by the top of the piston at upper center, an isolated pocket in communication with said combustion chamber through a restricted port, said port being directed toward said valve and means for supplying said pocket with a rich combustible mixture.

2. In an internal combustion engine, a cylinder, a piston reciprocating in said cylinder, a combustion chamber adjoining and communicating restrictedly with the end of said cylinder, the end of said cylinder being otherwise permanently closed by a head substantially engaged by the top of the piston at upper center, an isolated pocket in communication with said combustion chamber through a restricted port, said port being directed away from the cylinder bore, and means for supplying said pocket with a rich combustible mixture in such a manner that the quantity of this mixture admitted at minor engine loads will be insufficient to fill the pocket but so that at the intermediate and maximum loads an increasing excess will be carried out of the pocket into the combustion chamber.

3. In an internal combustion engine, a cylinder, a piston therein, a combustion chamber offset from but restrictedly communicating with said cylinder, a pocket communicating with said combustion chamber through a constricted passage, an ignition device in said pocket and means whereby during each suction stroke of the piston combustible mixture and air are successively admitted to the pocket and combustion chamber respectively, the volume of combustible mixture being varied from insufficient to fill the pocket at engine loads not giving sufficiently high temperature and pressure of combustion to secure the complete combustion of any excessively lean mixture formed by intermingling of a part of the mixture and the air during the suction stroke to an excess sufficient to form with the air in the cylinder an only slightly lean mixture at full engine loads.

4. In an internal combustion chamber, a cylinder, a piston therein, a combustion chamber offset from but restrictedly communicating with said cylinder, the end of said cylinder being otherwise permanently closed by a head substantially engaged by the top of the piston at top center, a pocket communicating with said combustion chamber through a constricted passage and adapted to be supplied with combustible mixture through a valved port, a single valve in said combustion chamber adapted to admit air thereto and carry off the products of combustion therefrom, means controlling said combustion mixture to limit the quantity to insufficient to fill said pocket at low engine loads and sufficient to mix with the air in the cylinder to form an only slightly lean normal mixture at full loads.

5. In an internal combustion engine, a cylinder, a piston therein, an offset combustion chamber restrictedly communicating with said cylinder, a single valve controlling a passage to said combustion chamber, a distributor valve adapted to alternately connect said passage during intake and exhaust strokes respectively to air and to an exhaust manifold, a pocket communicating through a restricted port with said combustion chamber, said passage being arranged between the second said valve and the said cylinder, means to supply a rich combustible mixture to said pocket controlled in quantity to insufficient to fill said pocket at small loads and above a critical load to an excess sufficient to mix with the air in the combustion space to form a lean mixture.

6. In an internal combustion engine the combination of a cylinder, a piston reciprocating within the cylinder, a combustion chamber adjoining and communicating restrictedly with the end of said cylinder, the end of said cylinder being otherwise permanently closed by a head substantially engaged by the top of the piston at its extreme upper position, a single mechanically operated valve opening into said combustion chamber, said valve being timed to open at the beginning of the exhaust stroke and remain open until the completion of the intake stroke, a passage leading to the combustion chamber through said single valve, means whereby this passage communicates with the atmosphere and an exhaust passage during the latter part of the intake stroke, and the exhaust stroke respectively, an isolated pocket in communication with the combustion chamber through a constricted passage, the same being directed away from the piston somewhat centrally into the combustion chamber, an ignition device within the pocket, means for supplying said pocket with a rich combustible mixture, means maintaining said rich mixture substantially within the pocket during the intake stroke at low engine loads, means forming within the compression chamber outside of said pocket a fuel-air mixture varying from pure air at low throttle ranges to an only slightly lean mixture at full engine load.

7. In an internal combustion engine the combination of a cylinder, a piston within the cylinder, a combustion chamber offset from but restrictedly communicating with said cylinder, the end of said cylinder being otherwise permanently closed by a head substantially engaged by the top of the piston at top center, a pocket communicating with the combustion chamber through a constricted opening, an ignition device in said pocket, means adapted to supply combustible mixture to the pocket in such a manner that at the lower engine loads the quantity admitted will be insufficient to fill the pocket but at medium and maximum loads an increasing volume will be carried out of the pocket into the cylinder, a single valve opening into the combustion chamber, the same being positively operated and timed to remain open only during the exhaust and intake stroke, a passage communicating through said single valve with the combustion chamber, and valve means controlling said passage maintaining it closed except during the exhaust stroke and the later part of the intake stroke when said means connects it with an exhaust and air passage respectively.

8. In an internal combustion engine, a cylinder, a piston in the cylinder, a combustion chamber offset from but restrictedly communicating with said cylinder, the end of said cylinder being otherwise permanently closed by a head substantially engaged by the top of the piston at top center, a pocket communicating through a constricted opening directed away from the cylinder, with the combustion chamber, an ignition device within the pocket, a valved port opening into the pocket and adapted to supply a rich combustible mixture to said pocket, a large valved port opening into the combustion chamber, means whereby this valved port is opened during the intake and exhaust strokes, a passage communicating with said valved port, valve means whereby this passage is opened during the latter part of the intake stroke and the exhaust stroke to an air passage and an exhaust passage respectively.

9. In an internal combustion engine, a cylinder, a piston in the cylinder, a combustion chamber offset from but communicating with said cylinder, the end of said cylinder being otherwise permanently closed by a head substantially engaged by the top of said piston at top center, a single valve controlling a passage to said cylinder and timed to be positively opened at the beginning of the exhaust period and closed only upon completion of the intake stroke, a distributor valve mechanism adapted to alternately connect the passage leading to said single valve during the intake and exhaust strokes to air and an exhaust manifold respectively, a pocket communicating through a restricted passage with said combustion chamber, an ignition device within the pocket, means supplying said pocket with a quantity of rich combustible mixture varying in volume from insufficient to fill the pocket at low engine loads to a considerable excess over that filling the pocket at full engine loads.

10. The herein described method of operating an internal combustion engine comprising taking into the compression chamber a small quantity of rich combustible mixture during the first part of the suction stroke, taking in air during the remainder of the suction stroke, maintaining the combustible mixture charge substantially isolated from the air during the intake stroke at minor engine loads, intermingling at intermediate engine loads an increasing volume of the rich mixture with the air admitted until at full throttle loads an only slightly lean mixture is thus formed, taking in with the air admitted a volume of products of combustion proportional to the engine load, compressing the total charge, igniting the compressed charge and exhausting the products of combustion.

11. The herein described method of operating an internal combustion engine consisting of taking into the engine compression chamber during the first part of the intake stroke a volume of excessively rich mixture, taking in pure air diluted with products of combustion proportional to the engine load during the latter part of the intake stroke, maintaining the charge of excessively rich mixture substantially isolated from the large volume of air during the intake stroke at low engine loads forming an admixture of the rich mixture and air throughout the intermediate and maximum engine loads, compressing the total charge, igniting it and exhausting the products of combustion.

12. The herein described method of operating an internal combustion engine which consists in taking into the engine compression chamber during the intake stroke a small volume of excessively rich mixture and a large volume of air diluted with products of combustion proportional to the engine load, maintaining the charge of mixture substantially isolated from the large volume of diluted air admitted during the intake at low engine loads, forming an admixture of the rich mixture and diluted air throughout the intermediate and maximum engine loads until at full engine load an only slightly lean mixture is thus formed, compressing the charge, igniting it when compressed, expanding the ignited charge and exhausting the products of combustion.

In testimony whereof I hereunto affix my signature.

FRANK MYRON JOBES.